US012786669B2

(12) United States Patent
Yerli

(10) Patent No.: US 12,786,669 B2
(45) Date of Patent: Nov. 3, 2026

(54) SYSTEM AND METHOD ENABLING ACCURATE CONTEXT-AWARE LOCATION BASED SERVICES

(71) Applicant: TMRW Group IP, Luxembourg (LU)

(72) Inventor: Cevat Yerli, Dubai (AE)

(73) Assignee: TMRW GROUP IP, Luxembourg (LU)

( * ) Notice: Subject to any disclaimer, the term of this patent is extended or adjusted under 35 U.S.C. 154(b) by 196 days.

(21) Appl. No.: 18/940,620

(22) Filed: Nov. 7, 2024

(65) Prior Publication Data

US 2025/0071521 A1 Feb. 27, 2025

Related U.S. Application Data

(63) Continuation of application No. 17/730,494, filed on Apr. 27, 2022, now Pat. No. 12,167,299.

(51) Int. Cl.

| | |
|---|---|
| ***H04W 4/029*** | (2018.01) |
| ***H04W 4/80*** | (2018.01) |
| *G01S 19/48* | (2010.01) |

(52) U.S. Cl.
CPC ............. *H04W 4/029* (2018.02); *H04W 4/80* (2018.02); *G01S 19/48* (2013.01); *G01S 19/485* (2020.05)

(58) Field of Classification Search
CPC ......... H04W 4/029; H04W 4/80; H04W 4/02; H04W 4/023; H04W 4/025; G01S 19/48; G01S 19/485; G01S 19/14; H04L 67/52; G06T 19/00; G06V 20/40; G08G 1/16
USPC ....................................................... 455/456.3
See application file for complete search history.

(56) References Cited

U.S. PATENT DOCUMENTS

| | | | |
|---|---|---|---|
| 11,012,482 B1 | 5/2021 | Yerli | |
| 2006/0224318 A1 | 10/2006 | Wilson et al. | |
| 2011/0316880 A1* | 12/2011 | Ojala | G06T 19/006 345/633 |
| 2014/0046589 A1 | 2/2014 | Metzler et al. | |

(Continued)

FOREIGN PATENT DOCUMENTS

| | | |
|---|---|---|
| CN | 109246195 A | 1/2019 |
| CN | 112102465 A | 12/2020 |

(Continued)

*Primary Examiner* — Don N Vo
(74) *Attorney, Agent, or Firm* — BRYAN CAVE LEIGHTON PAISNER LLP

(57) ABSTRACT

A system enabling accurate context-aware location-based services comprises at least one server computer storing a virtual world system configured to provide spatial data to a location-based services engine (LBS engine) associated therewith. The LBS engine is configured to obtain, from a processing device via a network, processed or semi-processed spatial data associated with a corresponding plurality of client devices, wherein the received spatial data is computed using data fusion algorithms by the processing device. The LBS engine is further configured to assess the spatial data to determine a spatial relationship between the client device and at least one target object stored in the virtual world system. If said spatial relationship matches a certain threshold, the LBS engine generates one or more location-based services for the plurality of client devices considering corresponding contextual data and sends the location-based services to the plurality of client devices via the network.

21 Claims, 6 Drawing Sheets

(56) References Cited

U.S. PATENT DOCUMENTS

| | | | | |
|---|---|---|---|---|
| 2016/0286351 | A1 | 9/2016 | Glenn, III et al. | |
| 2018/0300356 | A1* | 10/2018 | Li | G06F 16/444 |
| 2019/0171463 | A1 | 6/2019 | Energin et al. | |
| 2019/0361589 | A1 | 11/2019 | Yerli | |
| 2020/0104326 | A1 | 4/2020 | Ricci | |
| 2020/0402288 | A1 | 12/2020 | Yerli | |
| 2020/0402294 | A1* | 12/2020 | Yerli | G06T 15/205 |
| 2020/0402314 | A1* | 12/2020 | Yerli | H04L 67/131 |
| 2020/0404079 | A1* | 12/2020 | Yerli | G06T 11/00 |
| 2021/0058473 | A1 | 2/2021 | Yerli | |
| 2021/0074074 | A1* | 3/2021 | Goodrich | G06F 3/011 |
| 2021/0199460 | A1 | 7/2021 | Yerli | |
| 2021/0306805 | A1* | 9/2021 | Dawson | H04W 4/029 |
| 2022/0076504 | A1* | 3/2022 | Goodrich | G06F 3/011 |
| 2023/0277934 | A1* | 9/2023 | Benfold | G06T 19/006 463/31 |

FOREIGN PATENT DOCUMENTS

| | | | |
|---|---|---|---|
| EP | 3783863 | A1 | 2/2021 |
| KR | 20110028699 | A | 3/2011 |

* cited by examiner

100

500

SYSTEM AND METHOD ENABLING ACCURATE CONTEXT-AWARE LOCATION BASED SERVICES

REFERENCE TO PRIOR APPLICATIONS

This application is a continuation of U.S. patent application Ser. No. 17/730,494, filed Apr. 27, 2022, hereby expressly incorporated by reference in its entirety.

FIELD

The present disclosure generally relates to computer systems, and more specifically to a system, method, and computer-readable media enabling accurate context-aware location-based services.

BACKGROUND

Generally, location-based services are deployed in wireless networks that may be accessed by wireless devices, such as mobile phones, tablet computers, head-mounted displays, and other devices. Location-based services may include a broad range of services that may be based on the current location of a user with respect to a specific place. Examples of location-based services include providing the location of the nearest restaurant, banking automatic teller machines (ATMs), or the whereabouts of a person, parcel tracking, providing advertising directed at potential customers based on the current customer location, personalized weather services, and navigation services for driving, biking, hiking, and to avoid obstacles, such as traffic jams or accidents. Location-based services are typically provided via a wireless network to which a user of a wireless device may subscribe or connect to as a casual user. Once connected, the current user location may be derived from various types of information, such as GPS and/or cell tower triangulation techniques, amongst others.

Current positioning techniques lack or are at least limited in the flexibility of the location-based services provided. This is due to a rather "flat" positioning that is still predominant nowadays, wherein tracking of client devices is performed based mainly on the client devices' location without, in many cases, including a user's orientation with respect to an object of interest. Further technical reasons may include a limited contextual understanding of current positioning systems used in location-based services, meaning that the services may not consider factors such as other users nearby, time of the day, weather conditions, temperature, and the like, which could provide further options for users to interact with applications using location-based services.

Therefore, there is a need to develop technologies that increase the flexibility of provided location-based services with a higher degree of accuracy and contextual understanding.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

There is a need to develop technologies that increase the flexibility of provided location-based services with a higher degree of accuracy and contextual understanding. One or more of these or other problems are solved by embodiments of a system, method, and computer-readable media enabling accurate context-aware-location based services, as described herein.

According to one aspect, a system comprises at least one server computer comprising at least one processor and memory storing a virtual world system and a location-based services engine (LBS engine). The virtual world system is configured to provide spatial data to the LBS engine. The LBS engine is configured to obtain, from a processing device via a network, processed or semi-processed spatial data associated with a client device, wherein the obtained spatial data is computed using data fusion algorithms by the processing device. The LBS engine is further configured to assess the spatial data to determine a spatial relationship between a user of the client device and at least one target interaction object stored in the virtual world system. In response to determining that the spatial relationship matches a predetermined threshold, the LBS engine generates one or more location-based services for the client device based on contextual data associated with the client device, and sends the location-based services to the client device via the network.

The processing device may be a hardwired chip installed in the client device comprising at least one processing core. In further embodiments, at least one of the processing cores is a spatial core configured to obtain first positioning data from a global navigation satellite system (GNSS), and compute, through one or more hardwired algorithms, an initial position and orientation of the client device. The spatial core may be configured to perform the data fusion algorithms by augmenting the initial position and orientation based on second positioning data received from a cellular positioning system via at least one hardware interface, based on third positioning data received from one or more short range communication systems, and based on orientational data received from one or more gyroscopes, and by performing virtual world system computations from data obtained from the virtual world system, to obtain a refined 6 DOF position and orientation. In further embodiments, the spatial core is configured to further augment the initial position and orientation based on optical data obtained from optical sensors on one or more client devices, wherein the optical sensors utilize one or more of multi-user photogrammetry, crowd-sourced LIDAR, and photographic scanning.

In some embodiments, the location-based services comprise at least one of collision detections, collision warnings, delay warnings, and spatial operations. In further embodiments, the spatial operations comprise running a spatial operation authentication process based on the spatial relationship.

In some embodiments, the spatial data is embedded in captured video data, generating a positional video trajectory enabling the reconstruction of objects in a scene. This embedding of the positional and orientational data may assist in crowdsourced 3D mapping of areas, which may be used, for example, for location-based navigation services.

Generating the one or more location-based services for the client device based on the contextual data associated with the client device may comprise assessing one or more contextual relationships between the client device and at the least one target interaction object, wherein the one or more location-based services are adjusted based on the contextual relationship. The contextual data may include at least one of interest data, demographics data, service data, priority data, security data, and relationship data. At least part of the contextual data may be stored in a corresponding profile of the user of the client device.

In yet further embodiments, the LBS engine is further configured to record in memory a time duration of interaction between the user and at least one virtual object for use in determining interests of the user or a degree of interest of the user for accordingly generating the location-based services.

In another aspect of the current disclosure, a method is provided. The method may begin by obtaining, by a location-based services (LBS) engine from a processing device via a network, processed or semi-processed spatial data associated with a client device. The obtained spatial data includes 6 degrees of freedom (DOF) positional and orientational data computed using data fusion algorithms by the processing device. The LBS engine receives positional and orientational data from a virtual world system. The method may continue by assessing the spatial data to determine a spatial relationship between a user of the client device and at least one target interaction object stored in the virtual world system. In response to determining that the spatial relationship matches a predetermined threshold, the method continues by generating one or more location-based services for the client device based on contextual data associated with the client device. The method may continue by sending the location-based services to the client device via the network.

In some embodiments, the processing device is a hardwired chip comprising at least one processing core installed in the client device. In further embodiments, at least one processing core of the hardwired chip is a spatial core configured to obtain first positioning data from a global navigation satellite system (GNSS), and compute, through one or more hardwired algorithms, an initial position and orientation of the client device. In some embodiments, computing the spatial data using the data fusion algorithms may include augmenting the initial position and orientation based on second positioning data received from a cellular positioning system via at least one hardware interface, based on third positioning data received from one or more short range communication systems, and based on orientational data received from one or more gyroscopes, and by performing virtual world system computations from data obtained from the virtual world system, obtaining a refined 6 DOF position and orientation. In yet further embodiments, the spatial core is further configured to further augment the initial position and orientation based on optical data obtained from optical sensors on one or more client devices, wherein the optical sensors utilize at least one of multi-user photogrammetry, crowd-sourced LIDAR, and photographic scanning.

In some embodiments, the location-based services comprise at least one of collision detections, collision warnings, delay warnings, and spatial operations. In further embodiments, the spatial operations comprise running a spatial operation authentication process based on the spatial relationship.

In some embodiments, the method further comprises embedding the spatial data in captured video data to generate a positional video trajectory enabling the reconstruction of objects in a scene.

In some embodiments, generating the one or more location-based services based on the contextual data associated with the client device comprises assessing one or more contextual relationships between the client device and the at least one target interaction object, wherein the one or more location-based services are adjusted based on the contextual relationship. In further embodiments, the contextual data includes one or more of interest data, demographics data, service data, priority data, security data, and relationship data, and at least part of the contextual data is stored in a corresponding profile of the user of the client device.

In further embodiments, the method comprises recording in memory, by the LBS engine, a time duration of interaction between the user and at least one virtual object for use in determining interests of the user or a degree of interest of the user for accordingly generating the location-based services.

In another aspect of the current disclosure, one or more non-transitory computer readable-media are provided. The computer-readable media have stored thereon instructions configured to cause a server computer system comprising memory and at least one processor to perform a method comprising the steps of obtaining, by a location-based services (LBS) engine from a processing device via a network, processed or semi-processed spatial data associated with a client device, wherein the obtained spatial data includes 6 degrees of freedom (DOF) positional and orientational data computed using data fusion algorithms by the processing device, receiving, by the LBS engine, positional and orientational data from a virtual world system; assessing the spatial data to determine a spatial relationship between a user of the client device and at least one target interaction object stored in the virtual world system; in response to determining that the spatial relationship matches a predetermined threshold, generating one or more location-based services for the client device based on contextual data associated with the client device; and sending the location-based services to the client device via the network.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Embodiments of the current disclosure solve one or more problems by providing accurate context-aware location-based services to a plurality of client devices through a location-based engine (LBS engine) associated with a virtual world system stored in memory of at least one cloud server computer. The LBS engine receives spatial data comprising one or more of positional and orientational data from a plurality of processing devices associated with the corresponding plurality of client devices. The spatial data may be computed using data fusion algorithms by the processing devices and may comprise 6 degrees of freedom (DOF) positional and orientational data, enabling an accurate tracking of the client devices. The data fusion algorithms take data from a plurality of sources, such as global navigation satellite systems (GNSS), cellular positioning systems, short range communication systems, gyroscopes, internal measuring units (IMUs), and virtual world system spatial computations which, in combination, can generate a highly accurate position and orientation of each of the client devices.

The LBS engine assesses the spatial data to determine a spatial relationship between the client device and at least one target interaction object stored in the virtual world system. Then, if the spatial relationship matches a certain threshold, the LBS engine generates one or more location-based services for the plurality of client devices considering contextual data of the corresponding plurality of client device, and sends the location-based services to the corresponding plurality of client devices. Considering the contextual data of the client devices in view of the highly accurate position and orientation of the fused spatial data increases the flexibility and personalization capabilities of the location-based services, which may be useful for navigation services used in autonomous driving, car sharing services, traffic management, drone delivery services, surveillance services, factory management services, city management services, virtual shopping, factory management, entertainment, socializing, working, and the like.

Figure 1:
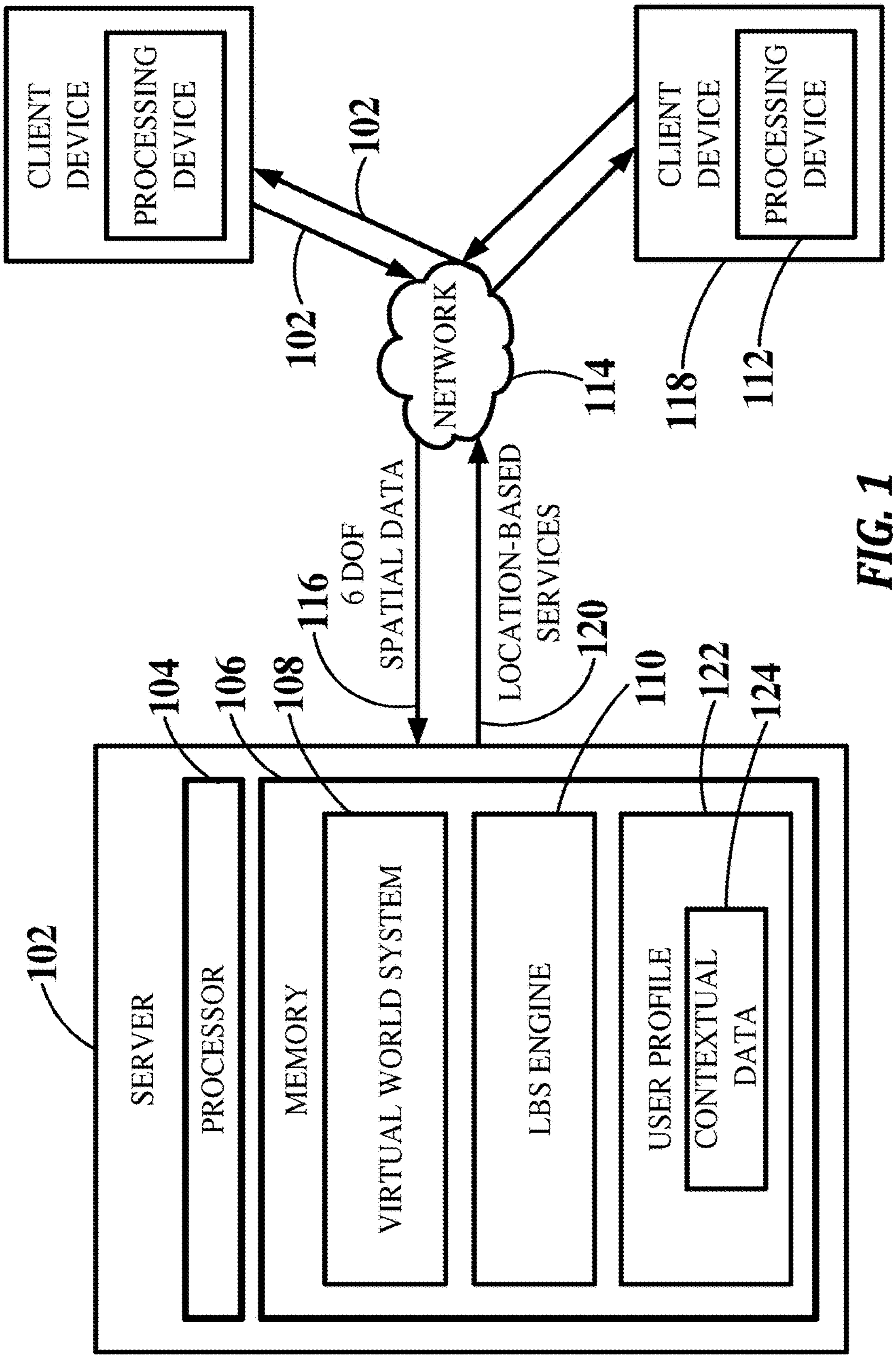
FIG. 1 illustrates an accurate context-aware location-based services (LBS) system, according to an embodiment.

FIG. 1 illustrates an accurate context-aware location-based services (LBS) system 100, according to an embodiment.

The LBS system 100 comprises at least one server computer 102 of a server computer system comprising at least one processor 104 and memory 106 storing a virtual world system 108 and an LBS engine 110. The virtual world system 108 is configured to provide data to the LBS engine 110, including at least spatial data about virtual objects that may or may not represent real objects. The LBS engine 110 is configured to obtain, from a processing device 112 via a network 114, processed or semi-processed spatial data 116 associated with a corresponding plurality of client devices 118, wherein the received spatial data is computed using data fusion algorithms by the processing device 112, enabling an accurate tracking of the client devices 118.

The LBS engine 110 may then assess the spatial data to determine a spatial relationship between the client device 118 and at least one target object stored in the virtual world system 108. Said assessment may be performed by comparing predetermined values assigned to distance and, optionally, orientation data that may determine whether the spatial relationship matches a certain threshold. If the spatial relationship matches the threshold, the LBS engine 110 may then generate one or more location-based services for the plurality of client devices considering contextual data of the corresponding plurality of client devices. For example, if the user is located within a specific distance of the at least one target interaction object and/or head and face orientation, then the LBS engine 110 may generate the corresponding location-based services considering contextual data of the corresponding plurality of client devices. The LBS engine 110 then sends the location-based services to the corresponding plurality of client devices via the network 114. For example, if a user interacts with an application associated with a real object through the corresponding virtual replica, the LBS engine 110 may measure the distance and/or position and orientation for comparison with the predefined threshold. If there is a match, the LBS engine 110 may generate the location-based services. This sending of the location-based services 120 is performed on a per-user basis based on a corresponding profile 122 of a user of the at least one client device 118 stored in memory 106 considering a user's contextual data 124.

In some embodiments, the LBS engine 110 is further configured to record in memory 106 the time duration of interaction between users through their client devices 118 and at least one virtual object of the virtual world system 108. The time duration may be used in determining the user's interests or the degree of each user's interests associated as part of the user's contextual data 124 for accordingly sending the location-based services 120.

In further embodiments, the positional and orientational data is embedded in captured video data, generating a positional video trajectory enabling the reconstruction of objects in a scene. The video data may be captured by optical sensors on cameras of the at least one client device 118. This embedding of the positional and orientational data may assist in crowdsourced 3D mapping of areas, which may be used, for example, for location-based navigation services.

The virtual world system 108 comprises a digital version of the real-world, including real-world coordinates, such as position, orientation, scale and dimension of real-world objects, the physical properties, and the 3D structure of each of the real objects in the form of real-time 3D virtual replicas. A "virtual replica" of the current disclosure refers to accurate and persistent virtual representations of real-world elements. In an embodiment, the virtual replicas refer to a virtual version, or virtual twin, of a real-world element, or real twin, which may either be mapped or modeled through computer assisted drawing (CAD) or computer-assisted engineering (CAE) methods, input by computer models of the real objects (e.g., building information models-BIMs) or other suitable methods, and which may mirror not just the appearance but also the behavior of the real twin. The real-world objects may additionally include sensors that can provide the virtual replicas with multi-source input data for enriching and synchronizing the virtual replicas with their respective real counterpart. Thus, virtual replicas may obtain data from one or more sources (e.g., from one or more real-world objects, environmental sensors, computing devices, etc.). As used herein, the term "multi-source data" refers to data that may be obtained from multiple sources.

The systems of the current disclosure may use a cloud to edge infrastructure that may implement distributed computing capabilities employing public or private cloud servers, fog servers, and systems, such as enterprise systems, mobile platforms, machinery, robots, vehicles, sensors or user devices, all of which may connect through the network 114. In some embodiments, the cloud to edge infrastructure further comprises a distributed ledger-based infrastructure (not shown) facilitating the transfer and storage of data to widely distribute the virtual world system 108, including virtual replicas, applications, and any event or interaction within the virtual world system 108. This way, resources including physical servers and network equipment enable a shared storage and computing that may be dynamically allocated depending on factors such as the distance of the user to the resources and the network and computational demand from the users relative to each other and to the locational positions where they are, commanding more or less compute accordingly. In some embodiments, the dynamic allocation of storage and computing is codified into smart contracts using the distributed ledger infrastructure, automatizing the operational logic (e.g., the computer logic behind each allocation of storage and computing) and the consequences or results of allocation.

As explained above, virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on a plurality of devices, wherein the further real-world data comprises video data, temperature data, real-time energy consumption data, real-time water consumption data, speed or acceleration data, or the like.

In an embodiment, in order to reduce hardware and network demands, contribute to the reduction of network latency, and improve the general digital reality experience, the system may connect through a network 114 including millimeter-wave (mmW) or combinations of mmW and sub 6 GHz communication systems, such as through 5th generation wireless systems communication (5G). In other embodiments, the system may connect through wireless local area networking (Wi-Fi), which may preferably provide data at 60 GHz. Provided communication systems may allow for low end-to-end (E2E) latency and high downlink speeds to end points in the field, complying with parameters for executing the typically highly-interactive applications. This results in high-quality, low latency, real-time digital application content streaming. In other embodiments, the system may communicatively connect through 4th generation wireless systems communication (4G), may be supported by 4G communication systems, or may include other wired or wireless communication systems.

Figure 2:
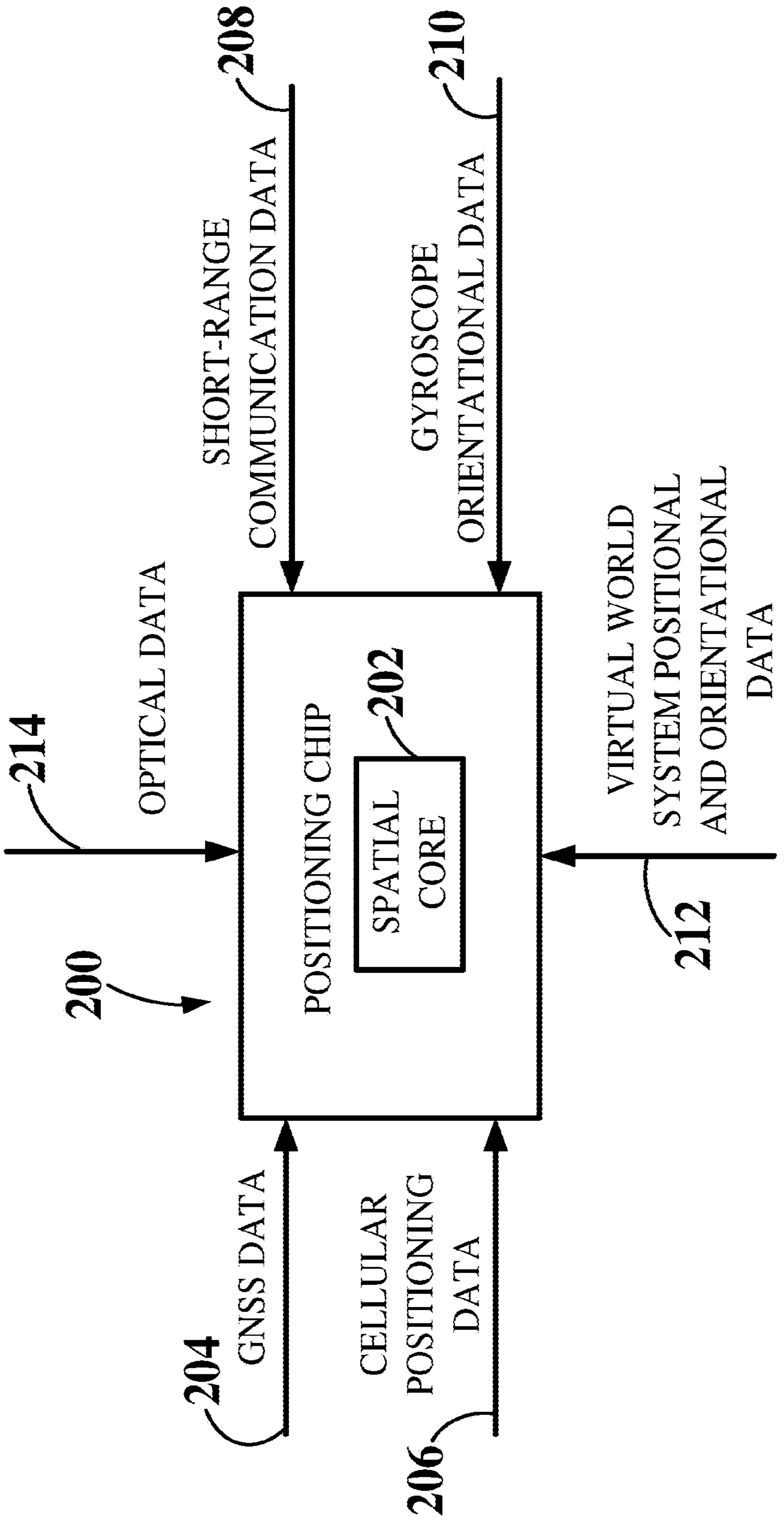
FIG. 2 illustrates a positioning chip receiving data from a plurality of sources, according to an embodiment.

FIG. 2 illustrates a positioning chip 200 receiving data from a plurality of sources, according to an embodiment.

The positioning chip 200 may be considered as a processing device (e.g., processing device 112 of FIG. 1) in the form of a hardwired or hardware chip installed on the corresponding plurality of client devices, each hardware chip comprising a plurality of processing cores. At least one of the processing cores may be a spatial core 202 configured to obtain first positioning data from a global navigation satellite system (GNSS data 204), and compute, through one or more hardwired algorithms (e.g., triangulation or trilateration), an initial position and orientation of a client device. The positioning data obtained via GNSS can refer to position, velocity and time (PVT) data. In alternative embodiments, the GNSS is augmented via other techniques known in the art, such as via differential GPS (DGPS), satellite-based augmentation systems (SBASs), real-time kinematic (RTK) systems.

In some embodiments, the spatial core 202 is further configured to perform data fusion algorithms by augmenting the initial position and orientation based on second positioning data received from a cellular positioning (cellular positioning data 206) system via at least one hardware interface. Positioning data refinement via the cellular positioning may be performed by a communications unit connected to the positioning chip via the one or more hardware interfaces via methods such as time of arrival (ToA), angle-of-arrival (AoA) and angle-of-departure (AoD).

In yet further embodiments, the spatial core 202 is further configured to augment the initial position and orientation based on third positioning data received from one or more short range communication systems (short-range communication systems data 208), such as Wireless Local Area Networks (WLAN) and Personal Area Networks (PANs). Augmenting the initial position and orientation based on short-range communication systems data 208 may be useful for positioning in short-range or indoor situations.

In yet another embodiment, the spatial core 202 is further configured to augment the initial position and orientation based on orientational data received from one or more gyroscopes (gyroscope orientational data 210). In yet another embodiment, the spatial core 202 is further configured to augment the initial position and orientation based on virtual world system computations performed from virtual world system positional and orientational data 212 data obtained from the virtual world system. The virtual world system computations may comprise 3D structure computations of real-world objects stored in the virtual world system; simulation data from a game and/or simulation engine; or combinations thereof.

In yet a further embodiment, the spatial core 202 is further configured to augment the initial position and orientation based on optical data 214 obtained from a plurality of optical sensors. The optical sensors utilize one or more of multi-user photogrammetry, or crowd-sourced LIDAR, or photographic scanning, or a combination thereof.

The spatial core 202 of the positioning chip 200 may utilize algorithms such as the Extended Kalman Filter (EKF) to combine the absolute positioning of the external positioning system and the relative positioning of the gyroscope and thus obtain very low-error, highly-accurate 6 DOF position and orientation of the devices implementing the one or more positioning chips. A Kalman Filter, also known as linear quadratic estimation (LQE), is an algorithm that uses a series of measurements observed over time, comprising statistical noise and other inaccuracies, and produces estimates of unknown variables that tend to be more accurate than those based on a single measurement alone, by estimating a joint probability distribution over the variables for each time-frame. The spatial core 202 may thus be considered as a hardwired fusion sensor core configured to implement position and orientation hardwired algorithms from a plurality of data sources for fusing the positioning data and obtaining a highly accurate 6 DOF position and orientation.

Figure 3:
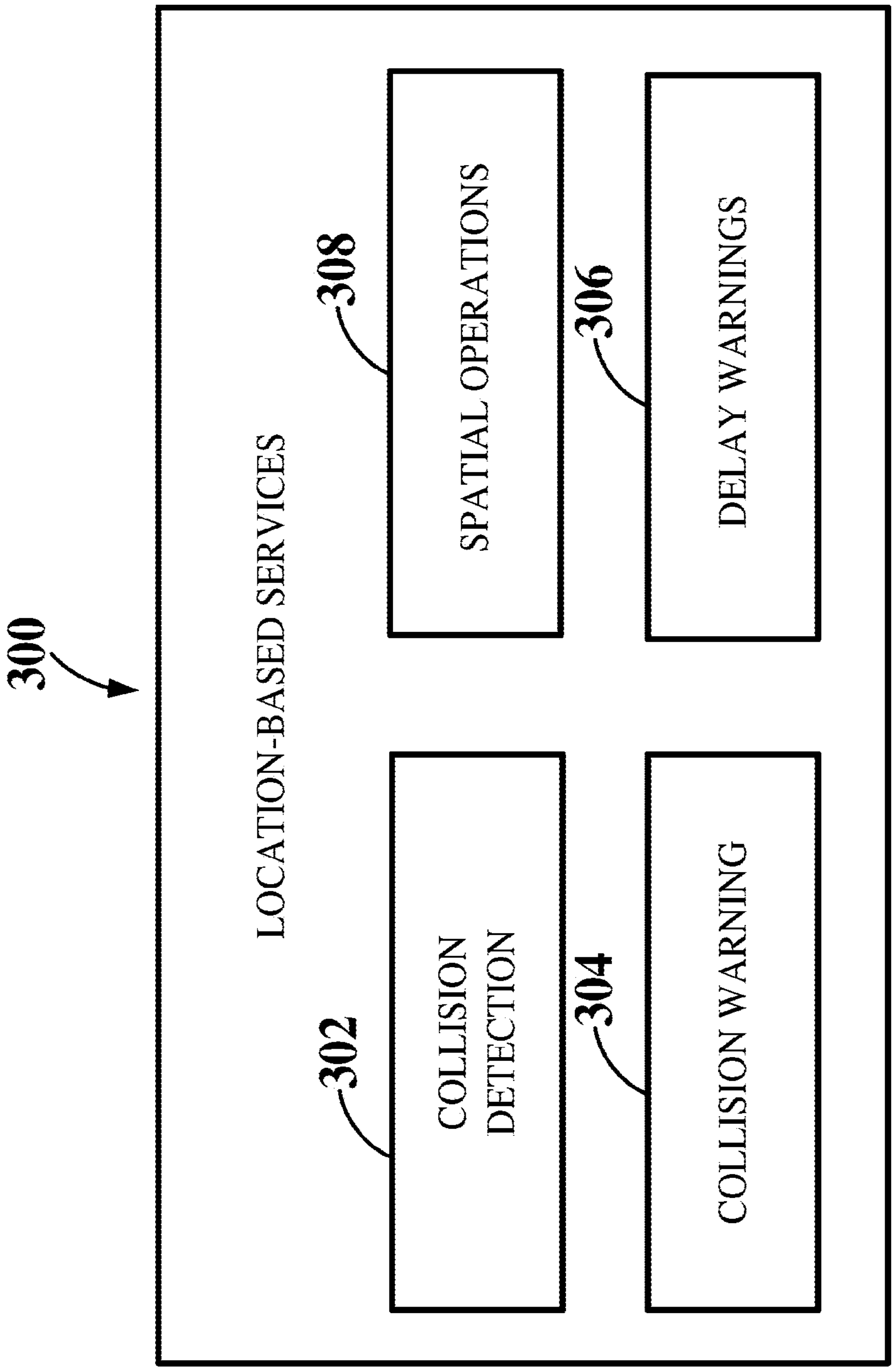
FIG. 3 illustrates sample accurate context-aware location-based services, according to an embodiment.

FIG. 3 illustrates sample context-aware location-based services 300, according to an embodiment.

The location-based services 300 may comprise, in some embodiments, collision detections 302, or collision warnings 304, or delay warnings 306, or spatial operations 308, or combinations thereof. Collision detections 302 refer to sensing when a vehicle collision has taken place. The LBS engine (e.g., LBS engine 110 of FIG. 2) may use the collision data obtained from the one or more vehicles that have collided, and would send the collision alert to any vehicles nearby that may be using the LBS engine. The collision computation may detect the intersection between two or more objects, such as two or more vehicles, or a vehicle and another object. In some embodiments, the collision data comprises accurate 6 DOF position and orientation of the vehicles calculated through a positioning chip, such as the positioning chip 200 of FIG. 3.

Collision warnings 304 may provide an alert of a potential collision that may take place unless an action is taken, and thus, may be used as a collision prevention system. The collision warning 304 computed by the LBS engine may monitor a vehicle's speed, the speed of a vehicle in front of it, the distance between the vehicles, the position and orientation of the vehicles and the direction of travel, so that a collision warning 304 may be provided to the drivers if the vehicles get too close. Collision warnings 304 may further include other location-based services, such as autonomous emergency braking (AEB), to decelerate the vehicles and avoid a collision.

The delay warnings 306 computed by the LBS engine may monitor traffic conditions and notify drivers about traffic jams, roadblocks, accidents, or any other potential reason of a delay in a specified route, and send a warning notification to drivers that could be affected by such delays.

The spatial operations 308 computed by the LBS engine refer to any type of operation that may be performed by a client device based on the user's current position and orientation (e.g., as calculated by the positioning engine run by the client device) in relation to one or more target objects, which may be another user, a virtual or real object comprising a virtual counterpart, or an application. The spatial operations 308 further consider contextual data of the corresponding plurality of client device. The operations may include commercial transactions, application or application object downloads, data exchange (e.g., user contact information exchange), and the like. In other embodiments, the spatial operations 308 comprise running a spatial operation authentication process based on the position and orientation of the client device and one or more target objects. Likewise, the spatial operation authentication process may further consider the contextual data of the corresponding plurality client devices.

For all the location-based services above, the LBS engine may the 6 DOF position and orientation data computed by the positioning chip. This makes the position and orientation data used by all the location-based services extremely accurate, increasing the flexibility and accuracy of the location-based services that may be provided to users.

Figure 4:
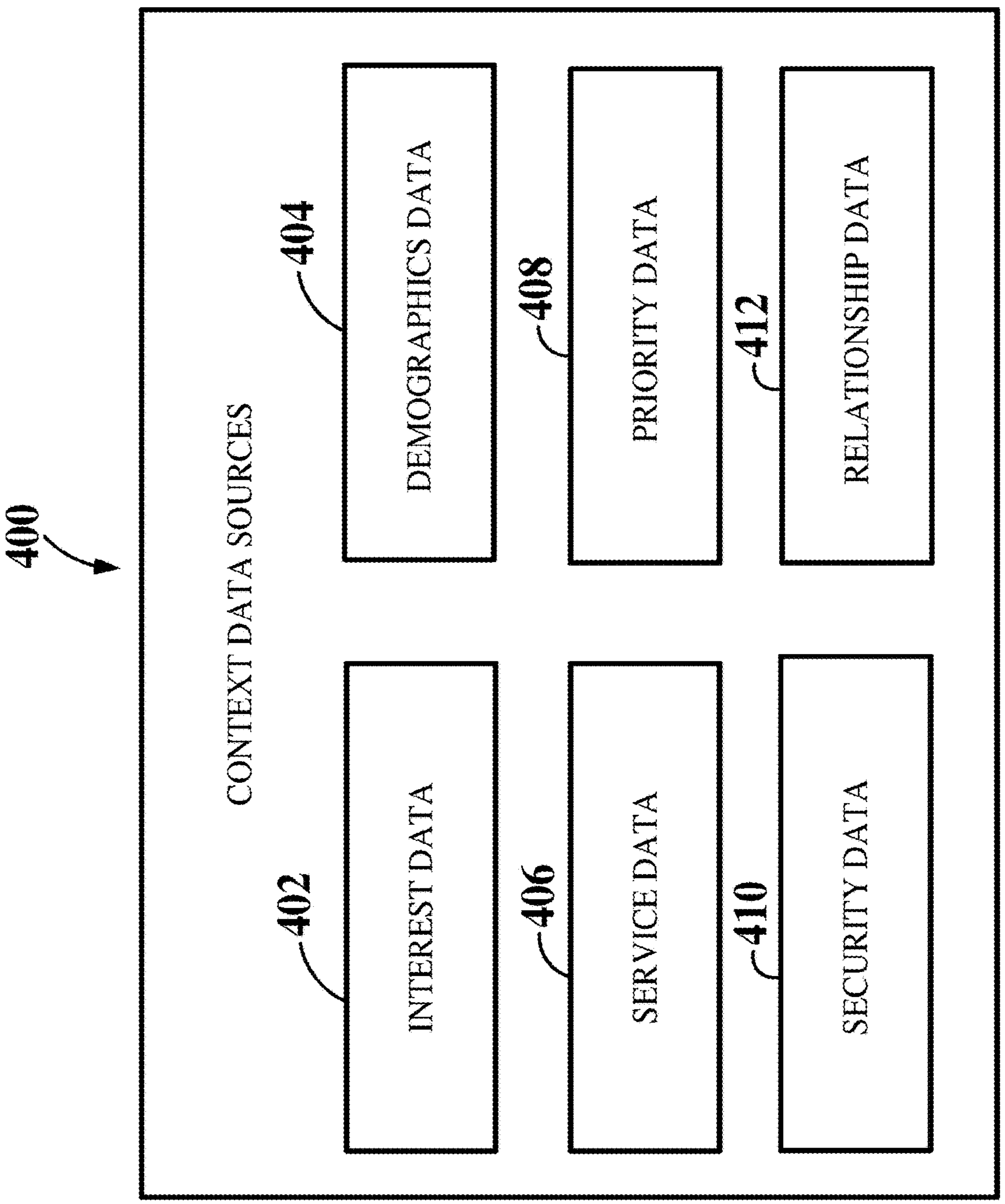
FIG. 4 illustrates sample context data sources that are considered for generating accurate context-aware location-based services of the current disclosure.

FIG. 4 illustrates sample context data sources 400 that are considered for generating location-based services of the current disclosure.

The context data sources 400 may be considered by the LBS engine when generating location-based services, such as the location-based services 300 of FIG. 3. For example, the LBS engine may assess one or more contextual relationships between the corresponding plurality of client devices and at least one target interaction object to adjust the selected location-based services based on the determined contextual relationship. The contextual relationships may thus be considered alone, or in view of other contextual data.

The context data sources 400 deriving the contextual relationships are selected from at least one of an interest data 402, demographics data 404, service data 406, priority data 408, security data 410, and relationship data 412. At least part of the contextual data is stored on a corresponding profile of a user of the at least one client device (e.g., as viewed in the user profile 122 of FIG. 1). When considering contextual data for generating location-based services, the LBS engine considers the client devices located within a specific distance of each other. Therefore, all the above context data sources 400 rely on data obtained from one or more client devices within a specified area. Thus, for example, the authentication process may be executed when users are located at a certain distance of each other but may also consider any of the context data sources 400 above, described in more detail below.

In some embodiments, provisioning the location-based services considering the context data sources 400 comprises requiring an invitee authorization. For example, if two users sharing common interests share contact data as part of a location-based service while being close to each other, previous to such data sharing, the users may receive a notification from the LBS engine that the two users are nearby and may ask whether they would like to receive an LBS service (e.g., a spatial operation, such as the mentioned contact data sharing). If both users approve such a request, both users may then receive the corresponding spatial operation.

The interest data 402 refers to data related to one or more topics that a user may find interest on, which may be classified in a plurality of categories. For example, a user may be interested in one or more categories such as sports, education, nutrition, dating, reading, gardening, programming, singing, etc. Each of these may comprise a score based on a user's selection sored in the user profile. In some embodiments, the LBS engine further records in memory the time duration of interaction between users and at least one virtual object that is used in determining the user's interests or the degree of each user's interests for accordingly sending the location-based services. Thus, the interest data 402 may be further affected by a user's time duration of interaction associated to a specific interest category. The LBS engine may perform a comparison between the interest scores for a specific user and another user to determine matching categories before sending an LBS service (e.g., a spatial operation 308 as described with reference to FIG. 3).

The demographics data 404 may refer to socio-economic information such as example, gender, age, data of birth, nationality, employment, race, education, income, civil status, and the like. The LBS engine may compare the demographics data 404 of different users to assess relevant location-based services to be provided.

The service data 406 may refer to data associated to the specific application services being received or requested by the user. The service data 406 may provide valuable information about the type of applications being used, which may be used when determining the type of location-based service to be generated and sent to the one or more client devices. Furthermore, the service data 406 may provide further clues about a client's interests and may be thus associated and added to the interest data 402.

Priority data 408 refers to the relative importance that certain users or entities may have when selecting the location-based services by the LBS engine. For example, the priority data may be determined by the type of contract agreed by the different parties, such as users and service providers. The type of priority may influence the context data rankings and thus the types of services that specific users may receive.

Security data 410 refers to a level of protection that may be applied for specific users to defend against cyber-risks, which may have an influence on the type of location-based service that may be received by the corresponding client devices. Security data may translate into various security measures and services such as data encryption, firewalls, Virtual Private Networks (VPNs), etc. The level of security may, like priority data 408, be determined by the type of contract.

Relationship data 412 may refer to the social relationship that users may have with each other. This relationship may be selected as a status, such as "family", "friends", "acquaintance", "friend of a friend", etc. The closer the relationship, the higher the chance that the users may be entitled to receive location-based services. For example, if the users are friends in social media, the users, from a certain distance, may receive a notification that a friend is nearby and may thus send the location-based services, accordingly.

In some embodiments, as described with reference to FIG. 3, spatial operations 308 (or other location-based services) provided by the LBS engine comprise running a spatial operation authentication process based on the position and orientation of the client device and one or more target objects. In these embodiments, the LBS engine prompts the users to perform one or more location-based actions to authenticate the transaction. For example, two users close to each other may stand at a specified spot or to rotate at a specific angle to enable the authenticate the location-based service. The users may be further enabled to authorize or refuse the request for receiving location-based services. In another example, a user standing close to a virtual object or application may be prompted to move to a certain position or to shift his or her orientation in order to enable a spatial operation (e.g., downloading the application, being able to interact with the virtual object, make a transaction, etc.).

Figure 5:
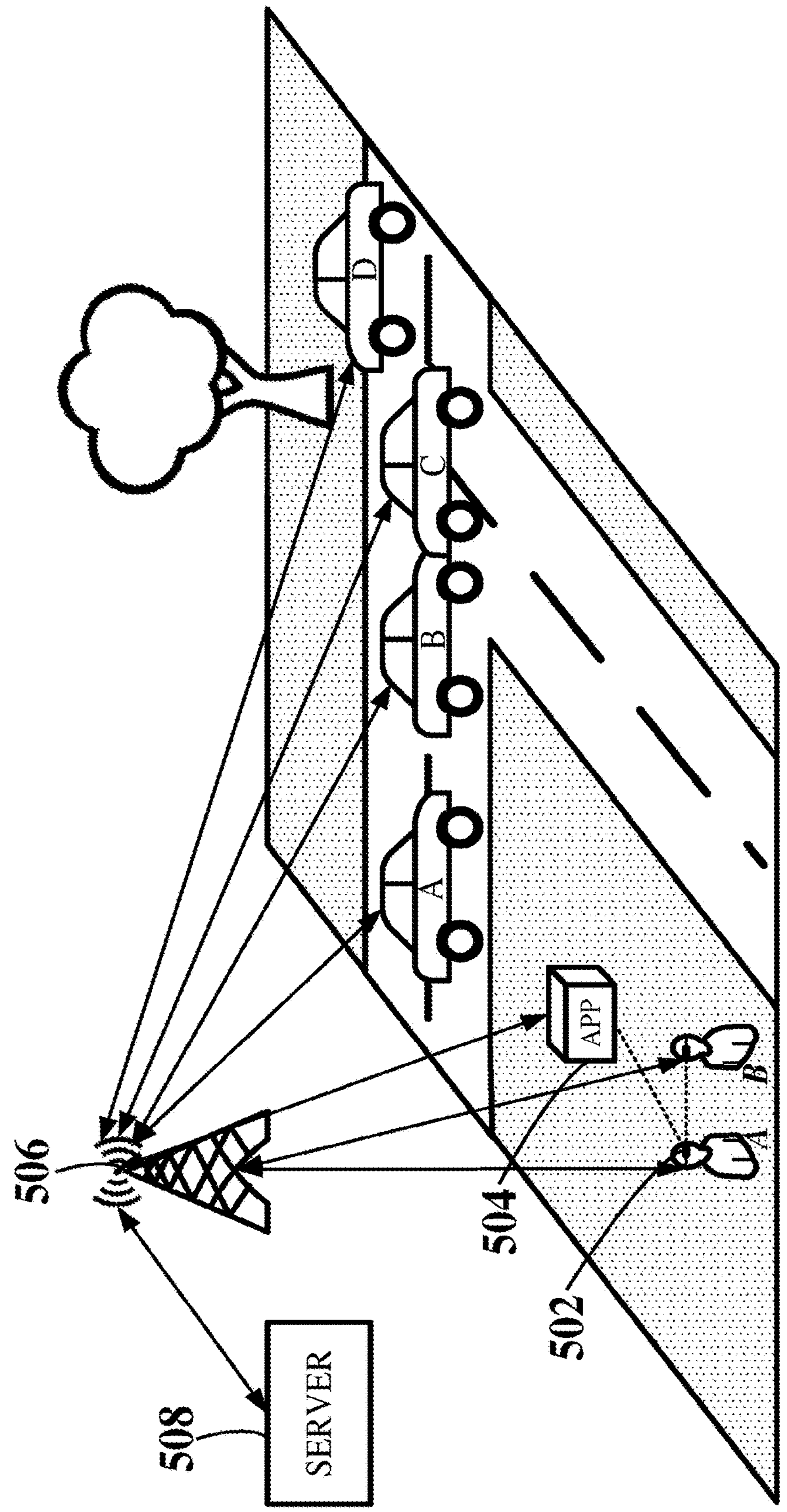
FIG. 5 illustrates an example application scenario of the accurate context-aware LBS system, according to an embodiment.

FIG. 5 illustrates an example application scenario of the accurate context-aware LBS system being used in an outdoor scenario 500, according to an embodiment.

The outdoor scenario 500 comprises four vehicles A-D, two users A-B wearing client devices 502, and an application 504, all sending signals to an antenna 506 which enables communication to a server 508. The server 508 stores in memory a virtual world system, an LBS engine, and a user profile comprising user interests, as described with reference to FIG. 1.

In the example outdoor scenario 500 of FIG. 5, users A and B face each other and are located at a relatively close distance. Users are continuously or semi-continuously tracked by the antenna 506, which obtains precise position and orientation from the client devices and sends the positional and orientational data to the server 508. The position and orientation may be 6 DOF position and orientation computed at least in part by the client devices 502 of the users through a positioning chip using data fusion algorithms, such as disclosed with reference to FIG. 2, enabling an accurate tracking of the client devices. The proximity of the users A-B may trigger the LBS engine hosted in the server 508 to assess their spatial data to determine a spatial relationship between users A and B. Further in this example, the positional and orientational data may be embedded in captured video data, generating a positional video trajectory enabling the reconstruction of objects in the outdoor scenario 500.

In one possible example application of the accurate context-aware LBS system in the outdoor scenario 500, the LBS engine determines that the spatial relationship between both users match a spatial threshold comprising, e.g., the distance based on their position, and also their orientation, and therefore generate one or more location-based services for each of them considering contextual data of the client devices 502 of each of the users A and B and send the corresponding services to each client device A and B. Apart from the spatial assessment performed by the LBS engine, LBS engine may determine that both users share a common interest and that they are friends in a social network. The LBS engine may thus send an alert to both users and may enable spatial operations between them, such as communication, sharing data (e.g., games, applications, contact data, music, etc.), or performing transactions with each other. Both users may authorize such a communication between them. Moreover, both users may perform a spatial authentication process, such as positioning themselves in a specific position or moving their head at a specific orientation to enable the location-based services. The current example application of the LBS system may thus be used to facilitate user communication and other services for a plurality of purposes, such as social (e.g., making new friends, dating, etc.), entertainment (e.g., gaming, sports, films), education, and the like.

In another possible example application of the accurate context-aware LBS system in the outdoor scenario 500, the LBS engine determines that the spatial relationship between user A and the application 504 match a spatial threshold comprising and therefore generate one or more location-based services for user A considering the user context data. For example, user A may be partially looking at the application 504, which may activate the location-based services for the user A. The LBS engine may prompt an automatic (e.g., with or without user authorization) download of the application, or to download one or more application objects for interaction through the client device 502. The LBS engine may further consider the contextual relationship between the user A and application 504. For example, if the application 504 is considered to match one of the user's interests, the LBS engine may enable the application to send one or more application services to the user A. User A may perform a spatial authentication process, such as positioning him or herself in a specific position or moving their head at a specific orientation in order to enable the location-based services.

In another possible example application of the accurate context-aware LBS system in the outdoor scenario 500, the LBS engine determines that vehicles B and C have collided, and thus sends a collision alert to vehicles B-C along with vehicles A and D because of being located nearby. The accuracy of the 6 DOF position and orientation computed by the vehicles (e.g., using a positioning chip, such as the positioning chip 200 of FIG. 2) may provide any vehicles in the vicinity (e.g., on another street or somewhere approaching the collided vehicles) with highly accurate position and orientation data of the collided vehicles and, if possible, with suitable notice in advance so that they do not get trapped in traffic. A similar logic may be applied to collision and delay warnings, whereby the LBS engine utilizes the accurate 6 DOF position and orientation to generate the alerts and any other service (e.g., automatic braking) in advance to assist the vehicles in preventing accidents or unnecessary delays.

Figure 6:
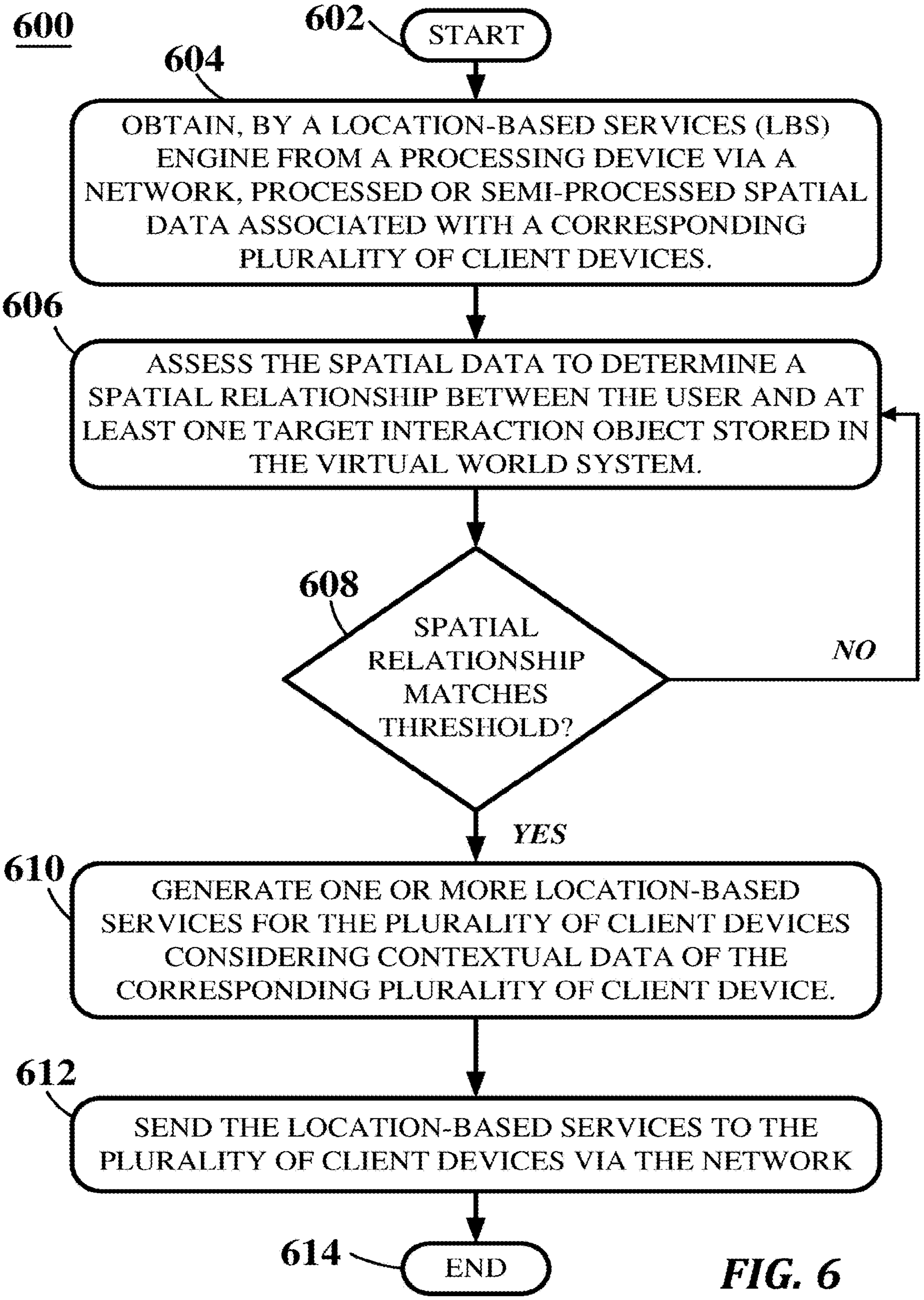
FIG. 6 illustrates a method enabling accurate context-aware location-based services, according to an embodiment.

FIG. 6 illustrates a method 600 enabling accurate context-aware location-based services, according to an embodiment. Method 600 may be implemented in a system, such as the LBS system 100 of FIG. 1.

The method 600 begins in steps 602 and 604 by obtaining, by a location-based services (LBS) engine from a processing device via a network, processed or semi-processed spatial data associated with a corresponding plurality of client devices. The received positional and orientational data is 6 degrees of freedom (DOF) positional and orientational data computed using data fusion algorithms by the processing device. Furthermore, the LBS engine receives positional and orientational data from a virtual world system.

The processing device may be a positioning chip in the form of a hardwired or hardware chip installed on the corresponding plurality of client devices, each hardware chip comprising a plurality of processing cores. At least one of the processing cores may be a spatial core configured to obtain positioning data from a global navigation satellite system (GNSS) and refine the data through one or more hardwired algorithms considering other a plurality of sources, such as cellular positioning systems, short range communication systems, gyroscopes, internal measuring units (IMUs), and virtual world system spatial computations which, in combination, can generate a highly accurate position and orientation of each of the client devices.

The method continues in step 606 by assessing the spatial data to determine a spatial relationship between the user and at least one target interaction object stored in the virtual world system. Said assessment may be performed by comparing predetermined values assigned to distance and, optionally, orientation data that may determine whether the spatial relationship matches a certain threshold. If, in check 608, the method 600 determines that the spatial relationship matches a certain threshold, the method 600 continues in step 610 by generating one or more location-based services for the plurality of client devices considering contextual data of the corresponding plurality of client device. Then, the method 600 proceeds in step 612 by sending the location-based services to the plurality of client devices via the network before ending the process in terminator 614.

The location-based services may comprise collision detections, or collision warnings, or delay warnings, or spatial operations, or combinations thereof. The spatial operations may comprise running a spatial operation authentication process based on the position and orientation of the one or more client devices and object of interest.

Considering contextual data of the corresponding plurality of client devices comprises assessing one or more contextual relationships between the corresponding plurality of client devices and at least one target interaction object, wherein the selected location-based services are adjusted based on the contextual relationship. The contextual relationships may be selected from at least one of an interest data, demographics data, service data, priority data, security data, and relationship data, wherein at least part of the contextual data is stored on a corresponding profile of a user of the at least one client device. In yet further embodiments, the LBS engine further records in memory the time duration of interaction between users and at least one virtual object that is used in determining the user's interests or the degree of each user's interests, which are associated with the contextual data, for accordingly sending the location-based services.

In some embodiments, the spatial data is embedded in captured video data, generating a positional video trajectory enabling the reconstruction of objects in a scene. This embedding of the positional and orientational data may assist in crowdsourced 3D mapping of areas, which may be used, for example, for location-based navigation services.

In some embodiments, the LBS engine further records in memory the time duration of interaction between users and at least one virtual object that is used in determining the user's interests or the degree of each user's interests for accordingly sending the location-based services.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system comprising:
- a virtual world system and a location-based services (LBS) engine;
- wherein the virtual world system is configured to provide spatial data to the LBS engine; and
- wherein the LBS engine is configured to:
  - obtain spatial data associated with a client device;
  - assess the spatial data to determine a spatial relationship between a user of the client device and a target interaction object stored in the virtual world system;
  - in response to determining that the spatial relationship matches a predetermined threshold, generate one or more location-based services for the client device based on contextual data associated with the client device, wherein the contextual data comprises a time duration of interaction between a user and the target interaction object; and
  - send the location-based services to the client device via the network.

2. The system of claim 1, wherein spatial data is obtained from a processing device associated with the client device, and wherein the processing device is a hardwired chip comprising at least one processing core installed in the client device.

3. The system of claim 2, wherein the obtained spatial data includes 6 degrees of freedom (DOF) positional and orientational data, wherein at least one processing core of the hardwired chip is a spatial core configured to:
- obtain first positioning data from a global navigation satellite system (GNSS); and
- compute, through one or more hardwired algorithms, an initial position and orientation of the client device;
- wherein computing the spatial data using the algorithms includes:
- augmenting the initial position and orientation based on second positioning data received from a cellular positioning system via at least one hardware interface, based on third positioning data received from one or more short range communication systems, and based on orientational data received from one or more gyroscopes; and
- performing virtual world system computations from data obtained from the virtual world system to obtain a refined 6 DOF position and orientation.

4. The system of claim 3, wherein the spatial core is further configured to further augment the initial position and orientation based on optical data obtained from optical sensors on one or more client devices, wherein the optical sensors utilize at least one of multi-user photogrammetry, crowd-sourced LIDAR, and photographic scanning.

5. The system of claim 1, wherein the location-based services comprise at least one of collision detections, collision warnings, delay warnings, and spatial operations.

6. The system of claim 5, wherein the spatial operations comprise running a spatial operation authentication process based on the spatial relationship.

7. The system of claim 1, wherein the spatial data is embedded in captured video data, generating a positional video trajectory enabling a reconstruction of objects in a scene.

8. The system of claim 1, wherein generating the one or more location-based services for the client device based on the contextual data associated with the client device comprises:

assessing one or more contextual relationships between the client device and the at least one target interaction object, wherein the one or more location-based services are adjusted based on the contextual relationship.

9. The system of claim 8, wherein the contextual data includes one or more of interest data, demographics data, service data, priority data, security data, and relationship data; and wherein at least part of the contextual data is stored in a corresponding profile of the user of the client device.

10. The system of claim 8, wherein the LBS engine is further configured to record in memory the time duration of interaction between the user and the target interaction object for use in determining interests of the user or a degree of interest of the user for generating the location-based services.

11. A method comprising:

obtaining, by a location-based services (LBS) engine, spatial data associated with a client device;

receiving, by the LBS engine, positional and orientational data from a virtual world system;

assessing the spatial data to determine a spatial relationship between a user of the client device and a target interaction object stored in the virtual world system;

in response to determining that the spatial relationship matches a predetermined threshold, generating one or more location-based services for the client device based on contextual data associated with the client device, wherein the contextual data comprises a time duration of interaction between a user and a target interaction object; and sending the location-based services to the client device via the network.

12. The method of claim 11, wherein the obtained spatial data includes 6 degrees of freedom (DOF) positional and orientational data, wherein obtaining the spatial data comprises obtaining the spatial data from a processing device associated with the client device, and wherein the processing device is a hardwired chip comprising at least one processing core installed in the client device.

13. The method of claim 12, wherein at least one processing core of the hardwired chip is a spatial core configured to:

obtain first positioning data from a global navigation satellite system (GNSS); and compute, through one or more hardwired algorithms, an initial position and orientation of the client device;

wherein computing the spatial data using the algorithms includes:

augmenting the initial position and orientation based on second positioning data received from a cellular positioning system via at least one hardware interface, based on third positioning data received from one or more short range communication systems, and based on orientational data received from one or more gyroscopes; and performing virtual world system computations from data obtained from the virtual world system to obtain a refined 6 DOF position and orientation.

14. The method of claim 13, wherein the spatial core is further configured to further augment the initial position and orientation based on optical data obtained from optical sensors on one or more client devices, wherein the optical sensors utilize at least one of multi-user photogrammetry, crowd-sourced LIDAR, and photographic scanning.

15. The method of claim 11, wherein the location-based services comprise at least one of collision detections, collision warnings, delay warnings, and spatial operations.

16. The method of claim 15, wherein the spatial operations comprise running a spatial operation authentication process based on the spatial relationship.

17. The method of claim 11, further comprising embedding the spatial data in captured video data to generate a positional video trajectory enabling a reconstruction of objects in a scene.

18. The method of claim 11, wherein generating the one or more location-based services based on the contextual data associated with the client device comprises:

assessing one or more contextual relationships between the client device and target interaction object, wherein the one or more location-based services are adjusted based on the contextual relationship.

19. The method of claim 18, wherein the contextual data includes one or more of interest data, demographics data, service data, priority data, security data, and relationship data; and wherein at least part of the contextual data is stored in a corresponding profile of the user of the client device.

20. The method of claim 18, further comprising recording in memory, by the LBS engine, the time duration of interaction between the user and the target interaction object for use in determining interests of the user or a degree of interest of the user for accordingly generating the location-based services.

21. A non-transitory computer-readable medium having stored thereon instructions configured to cause a server computer system comprising memory and a processor to perform a method comprising the steps of:

obtaining, by a location-based services (LBS) engine, spatial data associated with a client device;

receiving, by the LBS engine, positional and orientational data from a virtual world system;

assessing the spatial data to determine a spatial relationship between a user of the client device and at least one target interaction object stored in the virtual world system;

in response to determining that the spatial relationship matches a predetermined threshold, generating one or more location-based services for the client device based on contextual data associated with the client device, wherein the contextual data comprises a time duration of interaction between a user and a target interaction object; and sending the location-based services to the client device via the network.

* * * * *